A. M. HOLMES.
CAR SEAT AND COUCH.
No. 21,536. Patented Sept. 14, 1858.
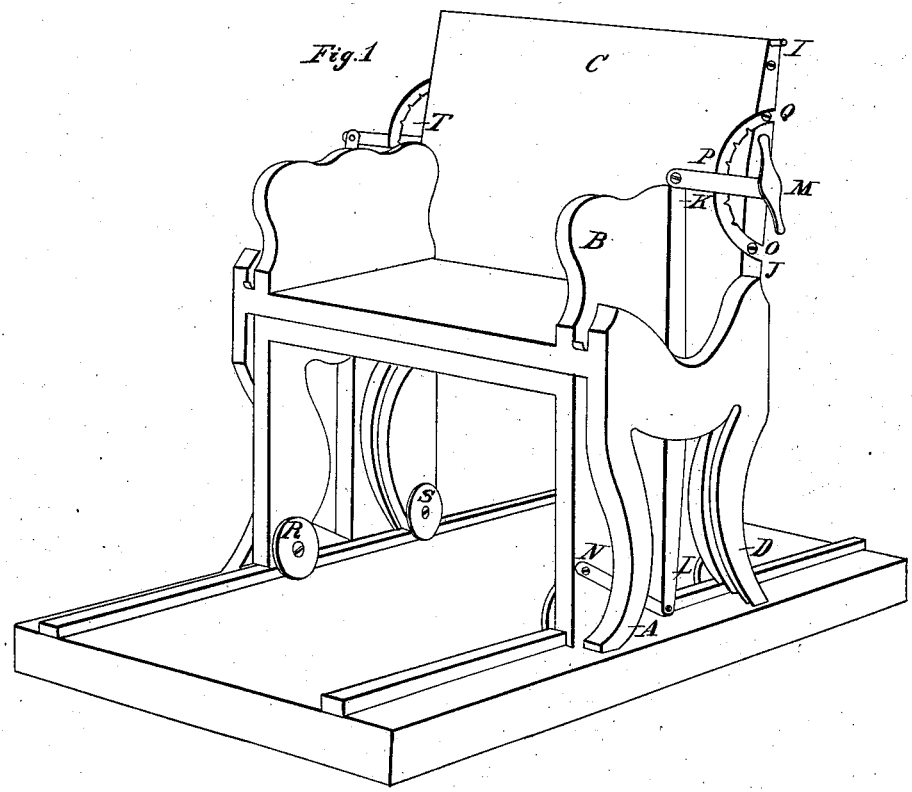
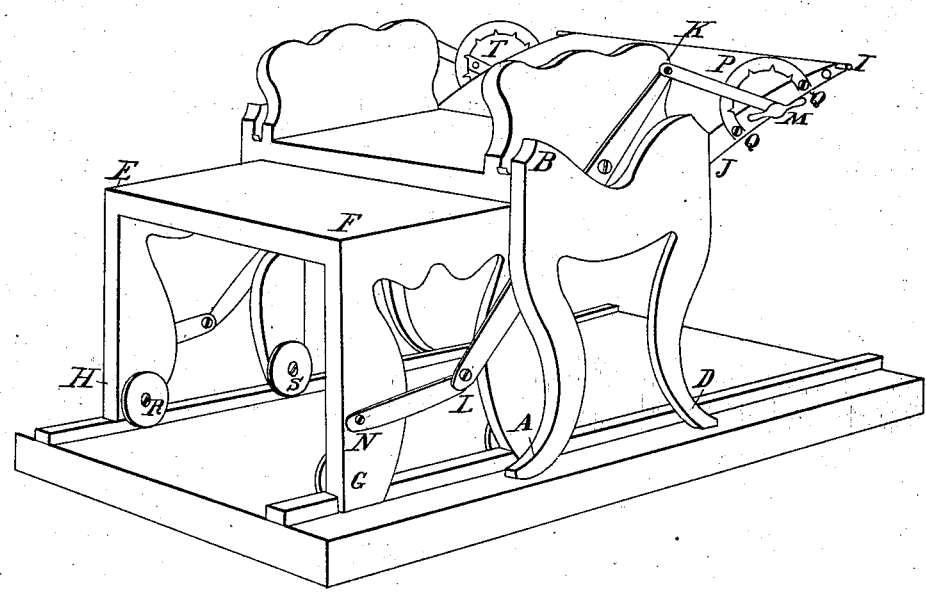

UNITED STATES PATENT OFFICE.

ALEXANDER M. HOLMES, OF EATON, NEW YORK, ASSIGNOR TO HIMSELF AND ALBERT G. PURDY, OF SAME PLACE.

CAR-SEAT AND COUCH.

Specification of Letters Patent No. 21,536, dated September 14, 1858.

*To all whom it may concern:*

Be it known that I, ALEXANDER M. HOLMES, of Eaton, in the county of Madison and State of New York, have invented a new and Improved Mode of Traveling in Railroad-Cars, and do hereby declare that the following is a full and exact description thereof.

The nature of my invention consists in providing a couch so fitted and adjusted to a car seat as will enable the passenger to recline or lie down for the purpose of repose when traveling.

To enable others to make and use my invention I will proceed to describe its construction and operation.

I construct a car seat similar to those ordinarily in use on the principal rail roads in the United States with the back so adjusted by means of an arm or a hinge or otherwise as to reverse the back and thus enabling the passenger to face forward or backward at pleasure or as circumstances may require. Under this seat I construct a movable seat or bench upon four legs adjusted so as the top thereof shall come to or near the bottom of the car-seat and capable of passing under it. This movable seat or bench is of about the same width as the car seat and fitted upon railways or in some other manner so as to be easily moved backward or forward and capable of being shoved under the ordinary car seat. Upon each side of the ordinary car seat and at about the center of it I place an upright lever extending from about the arm rail of the car seat to near the floor of the car secured by a bolt or pivot just above or near the bench or seat on which the passenger sits and so adjusted as to enable these levers to move backward or forward; between these upright levers and the rear legs of the movable seat or bench and near the car floor I attach a short lever or arm extending from the foot of the upright lever at an angle of about thirty degrees and fixed by a bolt or pivot to the rear legs of the movable seat or bench and also to the lower end of the upright lever.

From the upper end of the upright lever to the back of the ordinary car seat I attach a horizontal lever or arm secured by a bolt or pivot at the top of the upright lever and at the back of the ordinary car seat. The back of the car seat rests by means of a pivot bearing on an open hinge fastened at or about the seat of the ordinary car seat. Thus adjusted when the back on the ordinary car seat is pressed back to a horizontal position or approaching that position the movable seat or bench is shoved forward thus affording by the surface of the movable seat or bench, the seat of the ordinary car seat and the back of the ordinary car seat a convenient place to recline or lie down.

Upon each side of the back of the ordinary car seat is fixed a semicircle with indentations or notches on the inner side calculated to receive catches or dogs, so as to leave the back of the ordinary car seat fixed at any desirable elevation for repose. These catches or dogs consist of horizontal rods or bolts extending from the back of the seat on each side so as to enter the indentations or notches at any desired point. These catches or dogs are operated by means of the eccentric motion of a rod on the back of the seat and kept forward to their place by means of a spiral spring attached either to the rod or dogs.

This seat can be turned forward or backward at pleasure and the movable seat or bench shoved out either way.

For a more perfect illustration of this invention reference is made to the drawings accompanying this application.

The top of the movable seat or bench can be made horizontal or upon a declivity to suit the convenience or ease of the traveler.

The side of the ordinary car seat next to the alley of the car can be divided at its center and fixed upon hinges, so as to swing around from either side and enable the passenger to get into the alley without disturbing the passenger before him.

The movable seat or bench can be brought out backward or forward of the ordinary car seat as may be desired.

The following is an illustration of the diagrams herewith presented.

Figure 1 is the seat in perspective before drawn out as a couch. Fig. 2 is the seat after being drawn out as a couch.

A, B, C, D, is the ordinary car seat.
E, F, G, H, is the movable seat or bench when drawn out.
I, J, is the back.

K, L, is the upright lever.
K, M, is the upper arm; L, N, lower arm.
O, P, Q, is the semicircle; R, S, wheels.
T are the catches or dogs to hold the seat to its proper place.

What I claim as my invention and desire to secure by Letters Patent is—

The combination and arrangement of the specific desires herein set forth substantially as described for the purposes indicated.

Dated August 27th 1858.

ALEX. M. HOLMES.

Witnesses:
 L. T. HOLMES,
 I. STERLING SMITH.